UNITED STATES PATENT OFFICE.

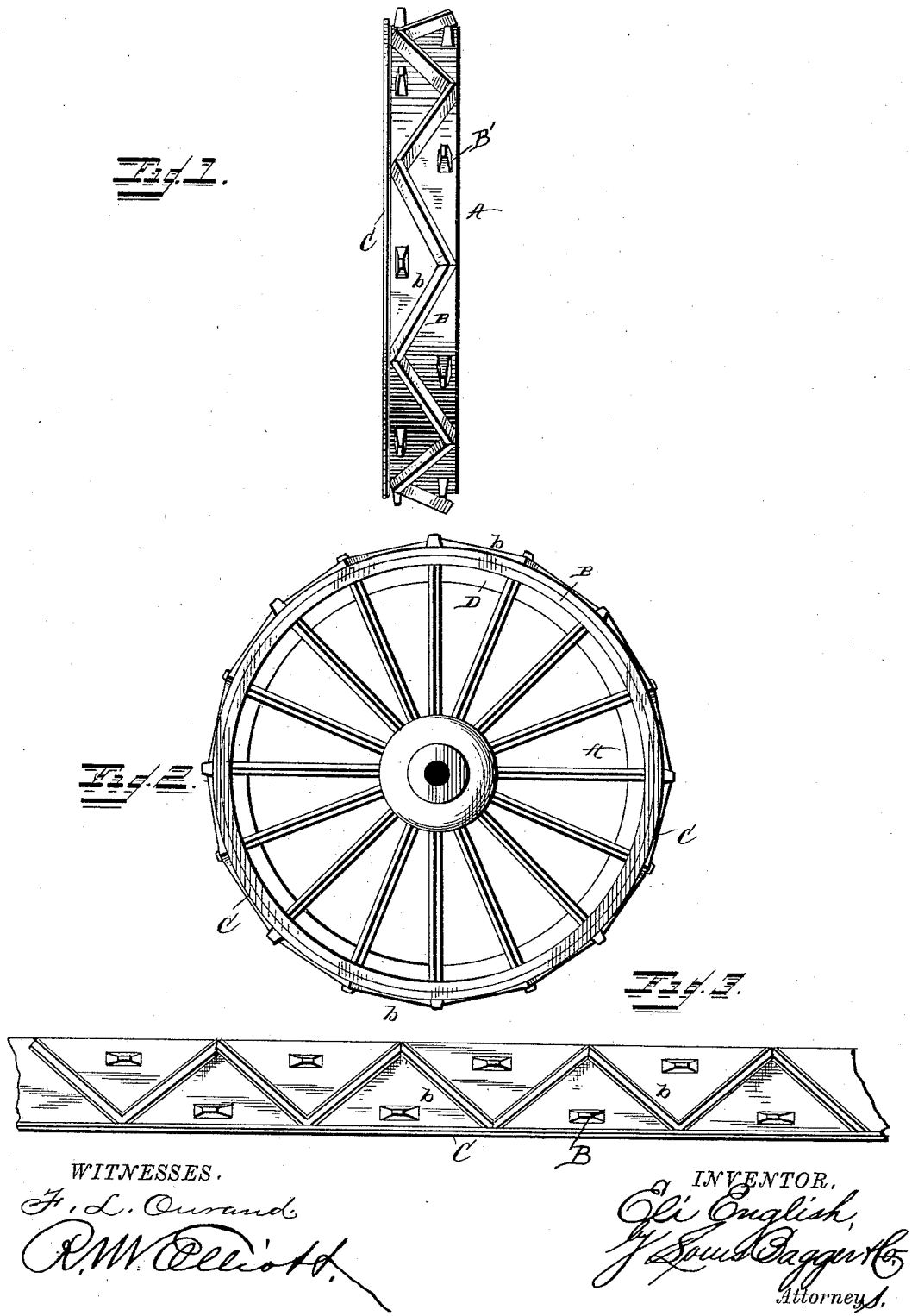

ELI ENGLISH, OF HOOSICK FALLS, NEW YORK, ASSIGNOR OF ONE-HALF TO PETER LIBERTY, OF SAME PLACE.

HARVESTER-WHEEL.

SPECIFICATION forming part of Letters Patent No. 391,740, dated October 23, 1888.

Application filed June 13, 1888. Serial No. 276,919. (No model.)

*To all whom it may concern:*

Be it known that I, ELI ENGLISH, a citizen of the United States, and a resident of Hoosick Falls, in the county of Rensselaer and State of New York, have invented certain new and useful Improvements in Harvesting-Machine Wheels; and I do hereby declare that the following is a full, clear, and exact description of the invention, which will enable others skilled in the art to which it appertains to make and use the same.

This invention relates to an improvement in wheels designed to be used on harvesters, reapers, mowers, and other agricultural implements.

The object of this invention is to simplify the construction of wheels such as are used to prevent harvesters, reapers, or mowers from sliding when used on hilly ground, and also to facilitate their manufacture and reduce the cost of production.

Heretofore it has been customary to either cast or rivet the lugs or projections on the arms of the wheels before referred to. It has been found in practice that when the said lugs are riveted or otherwise secured to the tire they work loose and fall out, thereby entailing not only great expense, but a considerable loss of time, and even where they are cast on the wheel they are apt to be broken off on account of the brittleness of the metal.

It is the object of this invention to overcome these difficulties by forming the lugs or projections on the tire by passing a plain sheet of iron or other suitable material, of suitable size to form the tire, through a die provided with suitable corrugations to press the metal out from the inside and form the projections on the outside of the tire, and at the same time to form a flange extending upward on one side and another flange extending downward on the other side.

With these objects in view the invention consists in a wheel to be used on any agricultural implement, the tire of which is provided with a number of outwardly-extending zigzag projections extending around the entire wheel; furthermore, in the combination, with the said wheel having a zigzag projection extending around its entire periphery, of lugs formed at intervals between the zigzag projections, whereby the wheel will be prevented from sliding to one side when the machine is used on hilly ground; furthermore, in the combination of a wheel provided on its periphery with a number of zigzag projections extending around its entire periphery, lugs placed at intervals between the said zigzag projections of flanges, one extending downward or toward the hub of the wheel and designed to prevent the entrance of dirt to the gearing in the wheel, and the other flange is to prevent the wheel from slipping, and, finally, in the various novel details of construction, as will be hereinafter fully set forth.

In the accompanying drawings, forming part of this specification, and in which like letters indicate corresponding parts, Figure 1 is an elevation of a wheel, showing the tire provided with the zigzag projections, lugs, and upwardly-extending flange. Fig. 2 is a side elevation of a wheel, showing the flange of the inner side; and Fig. 3 is a detail view showing a flat piece of steel or iron after it has left the die and before being bent to form the tire of the wheel.

Referring to the drawings, A designates the wheel, which is of the construction ordinarily employed on agricultural implements.

B designates the tire, on the outer surface of which is formed—as by stamping, rolling, or by hydraulic pressure—a number of zigzag or triangular projections or ridges, $b$, which extend around the entire periphery of the wheel and are pyramidal in shape. The edges may be sharpened, if desired; but it is preferred to have them blunt, as shown in the drawings.

At points preferably equidistant from each of the lugs forming the zigzag or triangular projections, and opposite their point of juncture, are formed other pyramidal lugs, B', which are of equal height with the larger projections, the two thus forming a solid and level tire, while the space that is left between the two projections will allow the wheel to take a sufficient hold upon the ground to prevent it slipping to one side when in operation.

On the outer side of the tire of the wheel is formed a flange, C, which is designed to act in unison with the projections to prevent the wheel from slipping when the ground is very hilly, and on the opposite side of the wheel to this flange is formed another flange, D, which extends inward or toward the hub, and is of sufficient width to prevent any dirt from falling upon the gears on the inside of the wheel. Thus it will be seen by this construction that this wheel will not only prevent the machine from any lateral movement while in use, and that it will protect the gear on the interior of the wheel from being clogged by dirt, but that it may also be made much cheaper than the ordinary wheel employed for this purpose, will be more durable, and cannot get out of repair by any amount of use.

Having thus fully described my invention, what I claim as new, and desire to secure by Letters Patent, is—

In a wheel to be used on harvesters, reapers, or other agricultural implements, the combination, with the tire having projections formed thereon to sink into the soil to prevent lateral movement of the machine while in use, and a flange formed on the outer edge of the said tire, designed to act in unison with the projections, of another flange extending inward from the side of the tire opposite that on which the upwardly-extending flange is formed, and designed to prevent the entrance of dirt to the gears on the interior of the wheel, substantially as described.

In testimony that I claim the foregoing as my own I have hereunto affixed my signature in presence of two witnesses.

ELI ENGLISH. [L. S.]

Witnesses:
J. J. DEMING,
JOSEPH PERRON.